United States Patent
Ambrose

(10) Patent No.: US 8,031,435 B2
(45) Date of Patent: Oct. 4, 2011

(54) MAGNETIC WRITE HEAD WITH THERMOELECTRIC COOLING DEVICE

(75) Inventor: Thomas Francis Ambrose, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 844 days.

(21) Appl. No.: 11/640,563

(22) Filed: Dec. 18, 2006

(65) Prior Publication Data

US 2008/0144214 A1    Jun. 19, 2008

(51) Int. Cl.
*G11B 5/40*    (2006.01)
*G11B 5/127*    (2006.01)

(52) U.S. Cl. ......... 360/125.32; 360/125.75; 360/125.06

(58) Field of Classification Search .............. 360/125.03–125.32, 125.74, 125.75
See application file for complete search history.

(56) References Cited

U.S. PATENT DOCUMENTS

| | | | |
|---|---|---|---|
| 4,405,961 A | 9/1983 | Chow et al. | |
| 5,955,772 A | 9/1999 | Shakouri et al. | |
| 5,965,840 A * | 10/1999 | Nagarajan et al. | 136/203 |
| 6,060,331 A | 5/2000 | Shakouri et al. | |
| 6,105,381 A | 8/2000 | Ghoshal | |
| 6,178,070 B1 * | 1/2001 | Hong et al. | 360/317 |
| 6,323,414 B1 | 11/2001 | Shakouri et al. | |
| 6,403,874 B1 | 6/2002 | Shakouri et al. | |
| 6,452,740 B1 * | 9/2002 | Ghoshal | 360/97.02 |
| 6,535,342 B1 * | 3/2003 | Ghoshal | 360/55 |
| 6,597,544 B2 | 7/2003 | Ghoshal | |
| 6,779,347 B2 | 8/2004 | Kucherov et al. | |
| 7,372,664 B1 * | 5/2008 | Mallary et al. | 360/123.02 |
| 7,508,626 B2 | 3/2009 | Ichihara et al. | |
| 2003/0033818 A1 | 2/2003 | Kucherov et al. | |
| 2005/0111137 A1 * | 5/2005 | Ju et al. | 360/126 |
| 2006/0119981 A1 * | 6/2006 | Li et al. | 360/125 |

FOREIGN PATENT DOCUMENTS

| | | | |
|---|---|---|---|
| JP | 57074814 A * | 5/1982 | |
| JP | 1213812 A | 8/1989 | |
| JP | 01213812 A * | 8/1989 | |
| JP | 5190315 A | 7/1993 | |
| JP | 6036928 A | 2/1994 | |
| JP | 2006013181 A | 1/2006 | |

OTHER PUBLICATIONS

L. Rushing et al., "Micro Thermoelectric Coolers for Integrated Applications", 16th International Conference on Thermoelectrics, 1997, pp. 646-649.

A. Shakouri et al., "Heterostructure Integrated Thermionic Coolers", Appl. Phys. Lett., vol. 71, No. 9, Sep. 1, 1997, pp. 1234-1236.

(Continued)

*Primary Examiner* — Daniell L Negron
*Assistant Examiner* — Adam B Dravininkas
(74) *Attorney, Agent, or Firm* — Robert P. Lenart, Esq.; Pietragallo Gordon Alfano Bosick & Raspanti, LLP

(57) ABSTRACT

An apparatus comprises a magnetic write pole, and a cooling device positioned adjacent to the magnetic write pole. The magnetic write pole can comprise a rare earth metal, or an alloy including a rare earth metal. A method of using a cooling device to increase a magnetic moment of a portion of a magnetic write pole in a magnetic recording head is also provided.

16 Claims, 6 Drawing Sheets

OTHER PUBLICATIONS

C. Labounty et al., "Design of Integrated Thin Film Coolers", 18th International Conference on Thermoelectrics, 1999, pp. 23-26.

A. Shakouri et al., "Thermionic Emission Cooling in Single Barrier Heterostructures", Appl. Phys. Lett., vol. 74, No. 1, Jan. 4, 1999, pp. 88-89.

C. Labounty et al., "Monolithic Integration of Thin-Film Coolers With Optoelectronic Devices", Opt. Eng., vol. 39, No. 11, Nov. 2000, pp. 2847-2852.

M. Toprak et al., "Nano-Engineered Thermoelectric Coating", Nanostructured Films and Coatings, 2000, pp. 149-156.

X. Fan et al., "High Cooling Power Density SiGe/Si Micro-Coolers", Electronics Letters, vol. 37, No. 2, Jan. 18, 2001, pp. 126-127.

Y. Hishinuma et al., "Vacuum Thermionic Refrigeration With a Semiconductor Heterojunction Structure", Appl. Phys. Lett., vol. 81, No. 22, Nov. 25, 2002, pp. 4242-4244.

T. E. Humphrey et al., "A Further Comparison of Solid-State Thermionic and Thermoelectric Refrigeration", 4 pgs.

* cited by examiner

MAGNETIC WRITE HEAD WITH THERMOELECTRIC COOLING DEVICE

FIELD OF THE INVENTION

This invention relates to data storage devices and more particularly to magnetic recording heads for use in data storage devices.

BACKGROUND OF THE INVENTION

In magnetic recording, a recording head is positioned adjacent to a data storage medium, and a write pole in the head produces a magnetic field that affects the direction of magnetization of magnetic domains in the storage medium. To increase the areal density of data stored in magnetic data storage devices, it is desirable to increase the write field produced by the recording heads. The pole piece material and the distance between the recording head and the medium determine the magnitude of the write field seen by the medium. Flying the head closer to the medium seems like an obvious choice to increase the write field, however, it remains an extreme engineering challenge. Therefore, the only other choice at hand, to increase the write field, is to change the pole tip material to a ferromagnetic material that possesses a large magnetic moment ($4\pi M$). Currently, the largest magnetic moment at room temperature is 2.45 T found in $Fe_xCo_{1-x}$ alloys, where x=0.5 to 0.6. These FeCo alloys were discovered over 50 years ago and still remain the highest moment material known.

To increase the write field, it would be desirable to increase the magnetic moment of the write pole material. There is a need for a recording head that can produce a write field that is larger than the write fields produced by previous head designs.

SUMMARY OF THE INVENTION

In a first aspect, the invention provides an apparatus comprises a magnetic write pole, and a cooling device positioned adjacent to the magnetic write pole. The magnetic write pole can comprise a rare earth metal, or an alloy including a rare earth metal.

The magnetic write pole can comprise a first pole piece having a first magnetic saturation, and a second pole piece having a second magnetic saturation, wherein the first magnetic saturation is greater than the second magnetic saturation.

The first pole piece can have a lower Curie temperature than the second pole piece. The cooling device can be positioned adjacent to the first pole piece, and can include, for example, a Peltier device or thermionic device.

In another aspect, the invention provides a method comprising: using a cooling device to increase a magnetic moment of a portion of a magnetic write pole in a magnetic recording head.

DETAILED DESCRIPTION OF THE INVENTION

Figure 1:
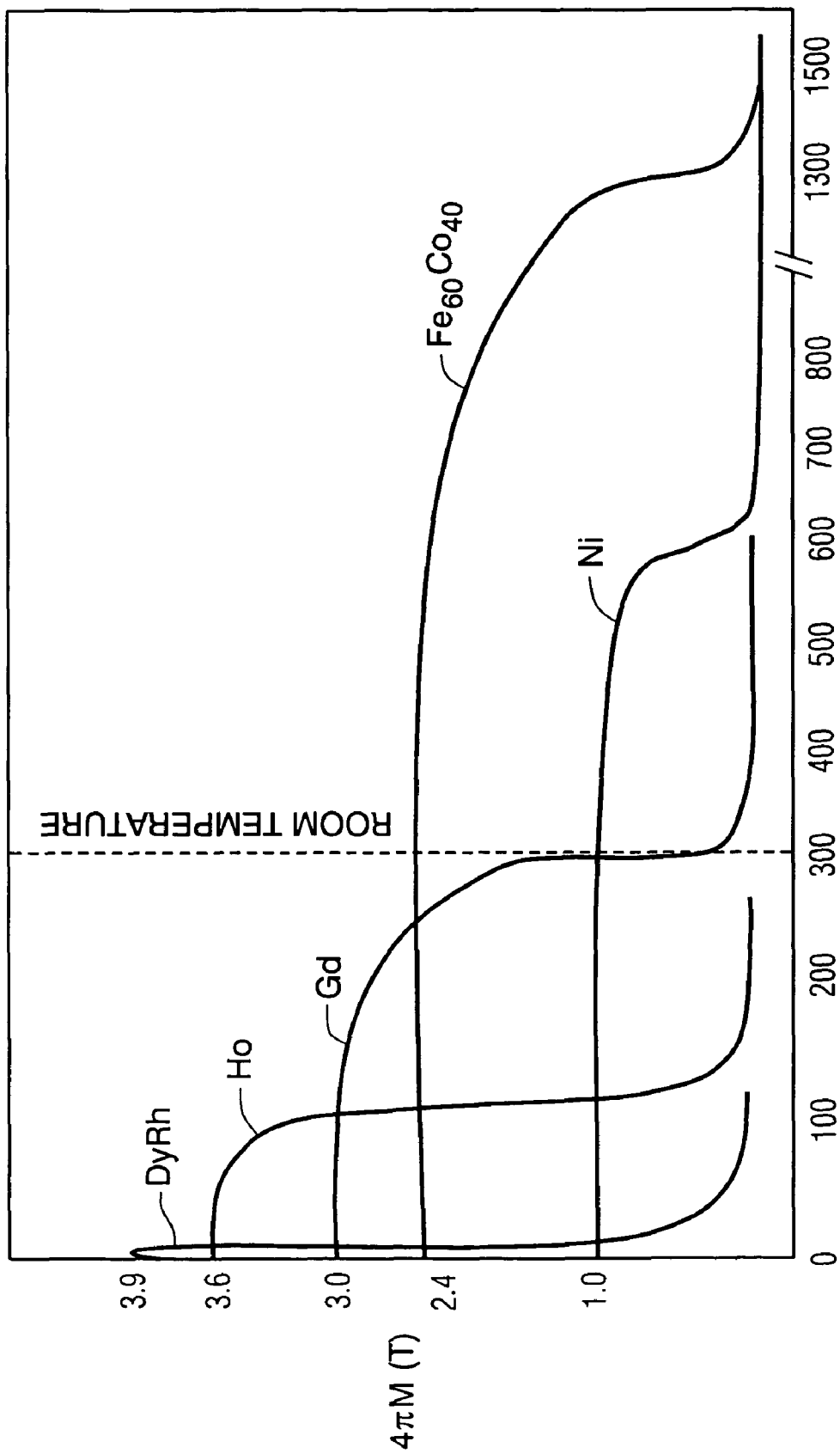
FIG. 1 is a graph of magnetic saturation versus temperature for several materials.

The Curie temperature is a temperature at which a ferromagnet loses its ferromagnetic ability to possess a net magnetization in the absence of an external magnetic field. Magnetic pole pieces in recording heads operate at temperatures that are below the Curie temperature of the material of the pole piece. FIG. 1 is a graph of magnetic saturation versus temperature for several materials. As seen from FIG. 1, materials such as gadolinium (Gd), holmium (Ho), and dysprosium-rhodium alloy (DyRh) exhibit Curie temperatures below room temperature (300° K).

In a first aspect, the invention provides a magnetic recording head that includes a cooling device for cooling a high moment write pole piece below its Curie temperature to increase the effective write field ($4\pi M$) value of the ferromagnetic material in the write pole. The cooling device can be a thermoelectric cooling device such as a Peltier device, which can be used to cool the write pole piece below ambient or room temperature.

Cooling the pole piece material below room temperature allows for the use of rare earth metals and alloys that typically have a larger magnetic moment than conventional FeCo alloys, but possess Curie temperatures below room temperature. To increase the write field magnitude, the recording heads of this invention cool a high moment write pole piece to a temperature below the Curie temperature of the pole material, and therefore naturally increase the $4\pi M$ value. With an increase in the magnitude of $4\pi M$ in the write pole, no changes in the medium design, protective overcoat and lubricant will be needed.

The advantages of cooling a pole piece material below room temperature can be described using the magnetization versus temperature diagram shown in FIG. 1. The magnetization in units of Tesla (T) is plotted as a function of temperature for a variety of different ferromagnetic metals and alloys. Of the materials considered in FIG. 1, the FeCo alloy has the highest Curie temperature ($T_C > 1300K$) and the largest room temperature (300K) magnetic moment of 2.45 T. Below room temperature there is a negligible change in the magnetization of FeCo due to the very high Curie temperature, since the saturation magnetization levels off to an almost constant value starting below 800K. The same conclusion can be reached for pure Ni with a $T_C = 620K$. It is clear that the magnetization of the conventional ferromagnets such as Fe, Co, Ni and their alloys, does not increase substantially when the materials are cooled to temperatures below 300K.

Recording heads constructed in accordance with this invention can include other ferromagnetic materials, such as the rare earth alloys. One can see from FIG. 1 that the magnetizations of Gd and Ho, as well as the alloy DyRh, have substantially higher moments than 2.45T. However, the large magnetizations can only be realized at temperatures well below room temperature. Thus a recording head write pole piece made up of a rare earth alloy and held at a temperature below room temperature can produce a write field 1.5 times larger than the conventional FeCo alloy.

Figure 2:
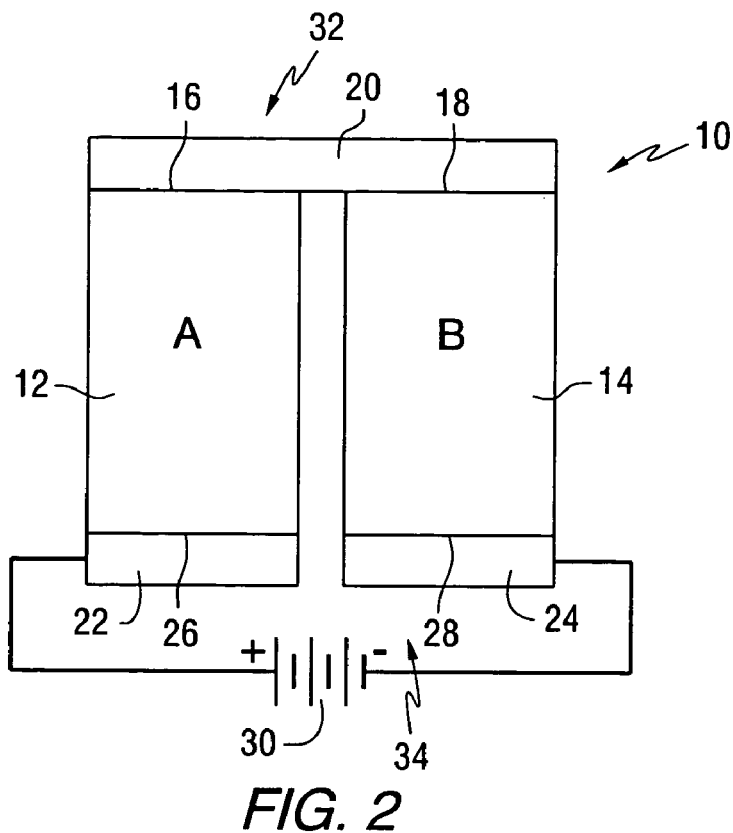
FIGS. 2 and 3 are schematic representations of Peltier cooling devices.

FIG. 2 is a schematic representation of a Peltier cooling device 10. The Peltier cooling device 10 includes first and second materials 12 and 14 (labeled A and B in FIG. 2) that are electrically connected at first ends 16 and 18 by an electrical conductor 20. Electrical contacts 22 and 24 are provided at second ends 26 and 28 of the materials 12 and 14. A voltage source 30 is connected to the contacts 22 and 24 to supply electric current to the device.

The Peltier Effect takes place when an electrical current is sent through two dissimilar materials that have been connected to one another at two junctions. One junction between the two materials becomes warm while the other becomes cool, in what amounts to an electrically driven transfer of heat from one side of the device to the other. This transfer can be so dramatic as to bring the cool side well below room temperature. While commercially available, Peltier units are rather large, with power cabling, a heat sink, and fans. The functional part of the unit that can be used in an actual recording head can be represented simply by the configuration shown in FIG. 2.

Materials A and B are different conducting materials, having different electron densities. When an electrical conductor connects materials A and B to each other, a new equilibrium of free electrons will be established. Potential migration creates an electrical field across each of the connections. When current is subsequently forced through the unit, the attempt to maintain the new equilibrium causes the electrons at one connection to absorb energy, and those at the other connection to release energy. This results in a cool end 32 and a hot end 34 of the device.

Figure 3:
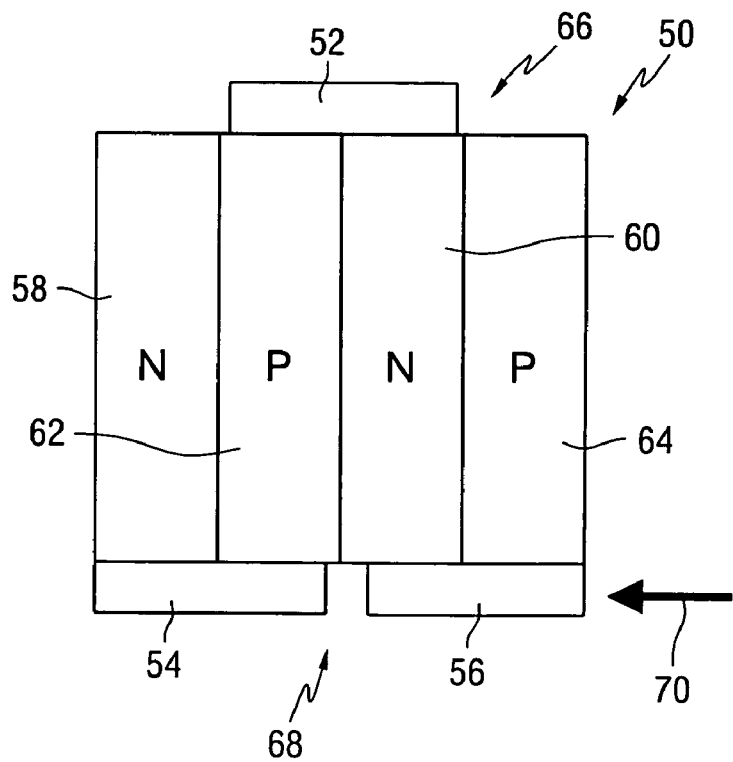

FIG. 3 is a schematic representation of a multi-stage Peltier cooling device 50. In the example of FIG. 3, electrical connections 52, 54 and 56 are used to connect N-type materials 58 and 60, and P-type materials 62 and 64 as shown. Materials 60 and 62 are electrically connected at a first end 66 by the conductor 52. Materials 58 and 62 are electrically connected at a second end 68 by the conductor 54. Materials 60 and 64 are electrically connected at the second end 68 by the conductor 56.

When a voltage is applied between connections 54 and 56, a current illustrated by arrow 70 is injected into the device. Electrons moving from the material with the electron deficit (e.g., the P-type material) to the material with the electron surplus (e.g., the N-type material) will absorb energy at the connector, while the electrons moving from N-type to P-type will release energy at the connector. This energy is absorbed and released in the form of heat, making the first end 66 cool and a second end 68 hot. The magnitude of this effect increases with the amount of current sent through the unit.

The "cold" side of the Peltier device can be positioned to be in intimate thermal contact with a high moment ferromagnetic write pole piece in a magnetic recording head. The chosen ferromagnetic pole piece material will have a substantial magnetic moment at low temperatures and may be non-magnetic at room temperature. For example, the material may have a Curie temperature of less than 300K.

The temperatures that can be achieved with this type of device depend on many things such as the ambient temperature, the nature of the thermal load, optimization of the current delivery to the device, and optimization of the heat sinks. In order to reach temperatures well below the Curie temperature of the high moment alloys, a multi-stage Peltier device may be required. However, the Peltier devices used in magnetic recording heads will only need to cool an area of for example 100 nm$^2$, or the size of the actual write pole. Therefore, power consumption should not be an issue and, more importantly, the small size will allow the device to reach colder temperatures as compared to commercial units that are cooling areas on the order of 10 in$^2$.

Figure 4:
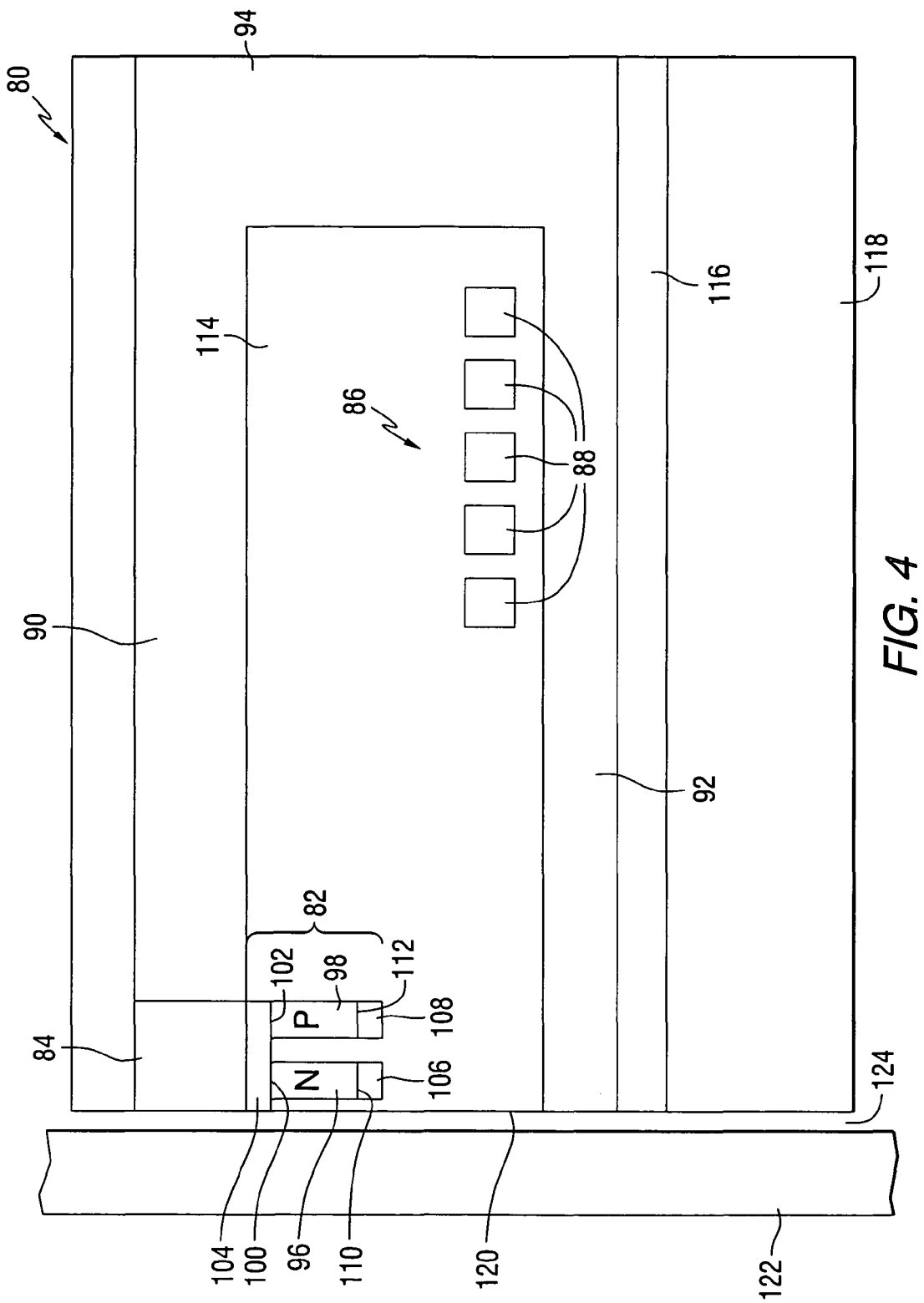
FIG. 4 is a cross-sectional view of a magnetic recording head that includes a cooling device.

An example of a recording head design is presented in FIG. 4. The recording head includes a cooling device in the form of a Peltier device that in principle would allow for areal density increases in data stored on an adjacent storage medium while using conventional magnetic medium. This cooling concept could also be extended to the reader to improve the giant magnetoresistance response while decreasing thermal noise effects.

FIG. 4 is a cross-sectional view of a magnetic recording head 80 that includes a cooling device in the form of a single stage Peltier device 82 in intimate thermal contact with a high moment ferromagnetic write pole piece 84. The recording head includes a coil 86, which in this example has five turns 88, and several soft ferromagnetic pole pieces 84, 90, 92 and 94. The cross-sectional area of pole piece 90 is larger than the cross-sectional area of pole piece 84. Pole pieces 84 and 90 form a write pole. Pole piece 92 is a return pole, and pole piece 94 is a pedestal that magnetically couples the write pole to the return pole. The Peltier device 82 includes first and second materials 96 and 98 electrically connected at first ends 100 and 102 by an electrical conductor 104. Electrical contacts 106 and 108 are electrically connected to second ends 110 and 112 of materials 96 and 98 respectively. In one example, material 96 can be an N-type conductor and material 98 can be a P-type conductor. The N-type material can be, for example, Se-doped $Bi_2Te_3$; and the P-type material can be, for example, Sb-doped $Bi_2Te_3$.

The coil and cooling device can be embedded in an insulator 114, such as alumina. An insulating layer 116, which can be alumina, separates the return pole from a substrate 118. The high moment ferromagnetic write pole piece 84 is positioned adjacent to an air bearing surface 120 of the recording head. The recording head is positioned adjacent to a recording medium 122, and separated from the recording medium by an air bearing 124.

The combination of the pole pieces and the coil forms an electromagnet. The Peltier device is positioned inside the electromagnet. Electrical connections to the Peltier device can be configured to prevent shorting to the pole pieces. The largest write field ($4\pi M$) will emerge from the high moment pole piece 84 that is directly in contact with the cold side of the Peltier device. The Peltier device can be fabricated by sputter deposition and/or plating with appropriate etching steps and sidewall deposition.

The example of FIG. 4 incorporates a Peltier device into a magnetic recording head, for a magnetic storage device such as a disc drive, to cool a portion of the electromagnet, namely the high moment pole piece, as a way of naturally increasing the effective write field ($4\pi M$). Pole pieces 90, 92 and 94 can be made of conventional materials such as FeCo alloys. The high moment pole piece 84 can be made of rare earth metals and alloys that have a significantly larger $4\pi M$ value compared to FeCo alloys at low temperature. The Peltier device can be fabricated by sputter deposition or plating techniques. The high moment pole piece alloys may be a RE-Rh based alloy where RE is a rare earth metal (for example, GdRh, DyRh, TbRh, HoRh, etc.). Additional transition metals such as Fe, Co and Ni can be added to the above alloys as well, to form, for example, FeDyRhCo, etc.

Figure 5:
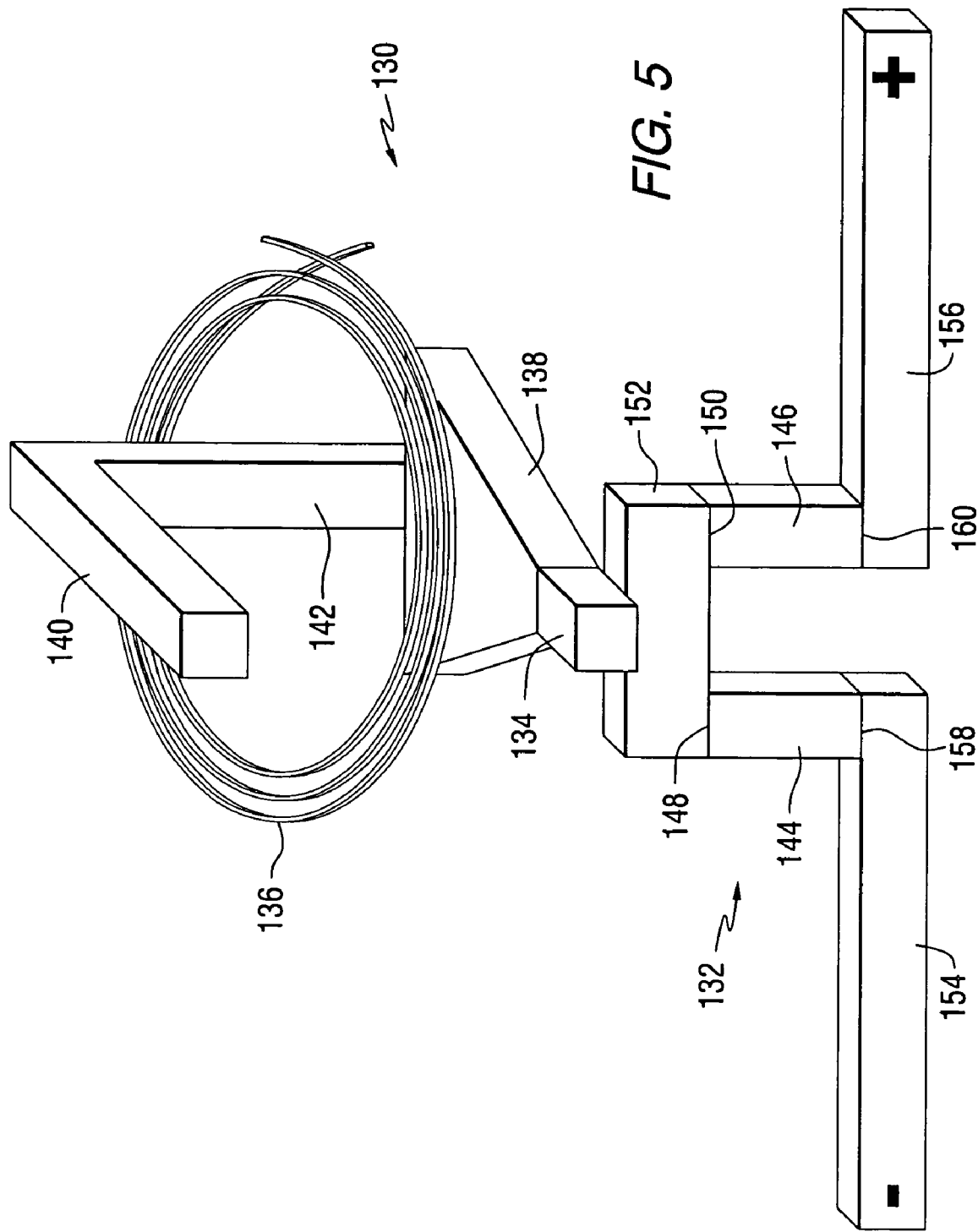
FIG. 5 is an isometric view of portions of a magnetic recording head that includes a cooling device.

FIG. 5 is a schematic representation of portions of another magnetic recording head 130 that includes a cooling device in the form of a single stage Peltier device 132 in intimate thermal contact with a high moment ferromagnetic write pole piece 134. The recording head includes a coil 136 and several soft ferromagnetic pole pieces 134, 138, 140 and 142. The cross-sectional area of pole piece 138 is larger than the cross-sectional area of pole piece 134. Pole pieces 134 and 138 form a write pole. Pole piece 140 is a return pole, and pole piece 142 is a pedestal that magnetically couples the write pole to the return pole. The Peltier device 132 includes first and second materials 144 and 146 electrically connected at first ends 148 and 150 by an electrical conductor 152. Electrical conductors 154 and 156 are electrically connected to second ends 158 and 160 of materials 144 and 146 respectively. In one example, materials 144 can be an N-type conductor and material 146 can be a P-type conductor. Conductors 154 and 156 can serve as heat sinks to remove heat from the hot end of the Peltier device.

The invention is not limited to Peltier thermoelectric devices. For example, a cooling device that employs a thermionic refrigeration may also be used. Thermionic refrigeration results from the emission of electrons into a vacuum using a semiconductor heterostructure under the influence of an electric field on the order of $10^6$ V/cm. This produces a cooling current that is dependent upon the Schottky barrier between the heterostructure and the contact metal. Theoretical calculations have suggested these devices may reach temperatures as low as 100K.

Figure 6:
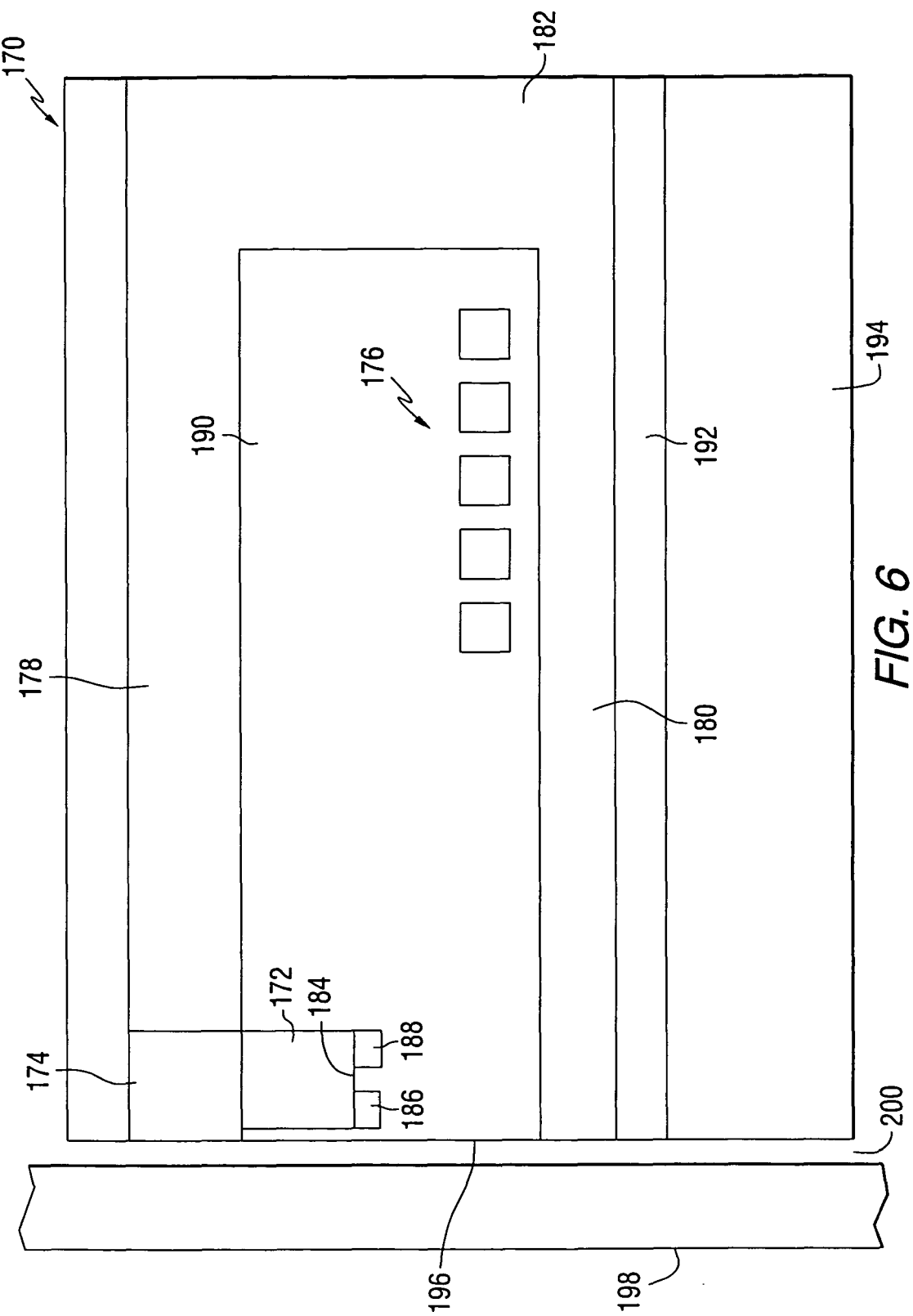
FIG. 6 is a cross-sectional view of a magnetic recording head that includes a cooling device.

Another example of a recording head is presented in FIG. 6. The recording head includes a cooling device in the form of a thermionic device that would allow for areal density increases while using conventional magnetic medium.

FIG. 6 is a cross-sectional view of a magnetic recording head 170 that includes a cooling device 172, which can be for example a thermionic device, in intimate thermal contact with a high moment ferromagnetic write pole piece 174. The recording head includes a coil 176 and several soft ferromagnetic pole pieces 174, 178, 180 and 182. The cross-sectional area of pole piece 178 is larger than the cross-sectional area of pole piece 174. Pole pieces 174 and 178 form a write pole. Pole piece 174 can be, for example, a DyFeRhCo alloy with $4\pi M_s > 4$ T. Pole piece 180 is a return pole, and pole piece 182 is a pedestal that magnetically couples the write pole to the return pole. The cooling device 172 is electrically connected at a first end 184 by electrical conductors 186 and 188. The coil and cooling device can be embedded in an insulator 190, such as alumina. An insulating layer 192, which can be alumina, separates the return pole from a substrate 194. The high moment ferromagnetic write pole piece 84 is positioned adjacent to an air bearing surface 196 of the recording head. The recording head is positioned adjacent to a recording medium 198, and separated from the recording medium by an air bearing 200.

The recording heads can also include a reader, and a cooling device such as a Peltier or thermionic device can also be positioned adjacent to the reader to cool the reader to increase the GMR or TMR effect while decreasing thermal noise.

Figure 7:
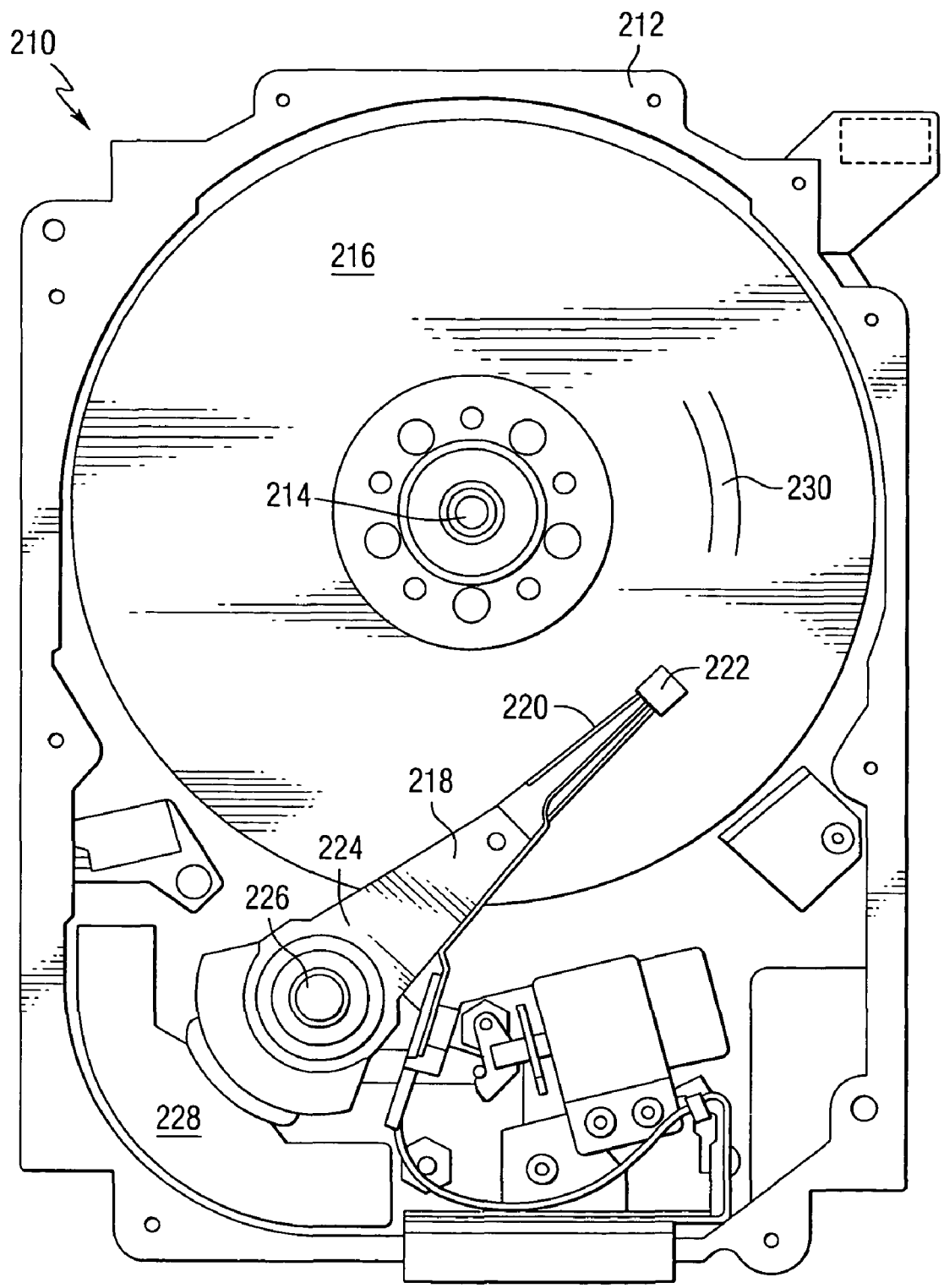
FIG. 7 is a pictorial representation of a magnetic storage device in the form of a disc drive that can include a recording head constructed in accordance with the invention.

FIG. 7 is a pictorial representation of a magnetic storage device in the form of a disc drive that can include a recording head constructed in accordance with the invention. The disc drive 210 includes a housing 212 (with the upper portion removed and the lower portion visible in this view) sized and configured to contain the various components of the disc drive. The disc drive 210 includes a spindle motor 214 for rotating at least one storage medium 216, which may be a magnetic recording medium, within the housing 212. At least one arm 218 is contained within the housing 212, with each arm 218 having a first end 220 with a recording head or slider 222, and a second end 224 pivotally mounted on a shaft by a bearing 226. An actuator motor 228 is located at the arm's second end 224 for pivoting the arm 218 to position the recording head 222 over a desired sector or track 230 of the disc 216. The actuator motor 228 is regulated by a controller, which is not shown in this view and is well-known in the art.

Recording heads constructed in accordance with this invention can be used in other types of data storage devices in which a magnetic field is applied to a data storage medium.

While the invention has been described in terms of several examples, it will be apparent to those skilled in the art that various changes can be made to the described examples without departing from the scope of the invention as set forth in the following claims.

What is claimed is:

1. An apparatus comprising:
   a magnetic write pole including first and second pole pieces, the first pole piece having a magnetic saturation greater than a magnetic saturation of the second pole piece, the first pole piece being positioned between an air bearing surface and the second pole piece, and the first pole piece and having a Curie temperature below ambient temperature; and
   a cooling device positioned adjacent to the first pole piece to cool a portion of the first pole piece below the Curie temperature.

2. The apparatus of claim 1, wherein the first pole piece comprises:
   a rare earth metal, or an alloy including a rare earth metal.

3. The apparatus of claim 1, wherein the first pole piece has a lower Curie temperature than the second pole piece.

4. The apparatus of claim 1, wherein the first pole piece comprises a DyFeRhCo alloy.

5. The apparatus of claim 1, wherein the cooling device comprises:
   a Peltier device or thermionic device.

6. The apparatus of claim 1, wherein the cooling device comprises a Peltier device including doped bismuth telluride materials.

7. The apparatus of claim 1, wherein the first pole piece comprises:
   an Rh based alloy.

8. The apparatus of claim 1, wherein the cooling device is positioned adjacent to the air bearing surface.

9. The apparatus of claim 1, wherein the cooling device is embedded in an insulator material.

10. A method comprising:
    providing a magnetic recording head having a magnetic write pole including first and second pole pieces, the first pole piece having a magnetic saturation greater than a magnetic saturation of the second pole piece, the first pole piece being positioned between an air bearing surface and the second pole piece, and the first pole piece having a Curie temperature below ambient temperature; and
    using a cooling device to increase a magnetic moment of the magnetic write pole by cooling a portion of the first pole piece below ambient temperature and below the Curie temperature of the magnetic write pole.

11. The method of claim 10, wherein the portion of the first pole piece comprises:
    a rare earth metal, or an alloy including a rare earth metal.

12. The method of claim 10, wherein the first pole piece has a lower Curie temperature than the second pole piece and the cooling device is positioned adjacent to the first pole piece.

13. The method of claim 10, wherein the cooling device comprises:
    a Peltier device or thermionic device.

14. The method of claim 10, wherein the cooling device comprises a Peltier device including doped bismuth telluride materials.

15. The method of claim 10, wherein the magnetic write pole comprises:
    an Rh based alloy.

16. The method of claim 10, wherein the cooling device is positioned adjacent to the air bearing surface.

* * * * *